US007648565B2

(12) United States Patent
Clausen et al.

(10) Patent No.: US 7,648,565 B2
(45) Date of Patent: Jan. 19, 2010

(54) FILTER ELEMENT

(75) Inventors: Michael D. Clausen, Turlock, CA (US); Peter Popoff, Modesto, CA (US); Steven D. Hardison, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 484 days.

(21) Appl. No.: 11/456,099

(22) Filed: Jul. 7, 2006

(65) Prior Publication Data

US 2007/0017370 A1 Jan. 25, 2007

Related U.S. Application Data

(60) Provisional application No. 60/698,827, filed on Jul. 13, 2005.

(51) Int. Cl.
*B01D 46/00* (2006.01)

(52) U.S. Cl. .................... 96/4; 96/6; 96/219; 210/188; 210/436

(58) Field of Classification Search ....................... 96/4, 96/155, 234, 6, 219; 95/46, 273; 210/188, 210/299, 312, 313, 321.77, 321.86, 489.1, 210/493.5, DIG. 5, 436
See application file for complete search history.

(56) References Cited

U.S. PATENT DOCUMENTS 5,458,767 A 10/1995 Stone .......................... 210/90
5,462,658 A * 10/1995 Sem ........................ 210/172.1
5,507,942 A 4/1996 Davis .......................... 210/94
5,509,950 A * 4/1996 van de Graaf et al. ......... 55/486
5,766,449 A 6/1998 Davis .......................... 210/86
5,814,133 A * 9/1998 Hunter et al. ................. 95/288
6,113,784 A * 9/2000 Stoyell et al. ............ 210/493.2
RE37,165 E 5/2001 Davis .......................... 210/86
6,540,909 B2 4/2003 Smith et al. ................... 210/95
6,557,719 B1 * 5/2003 Arnal et al. ................. 220/562
6,610,198 B1 8/2003 Jiang et al. .................... 210/86
6,623,631 B1 * 9/2003 Graus et al. ................. 210/120
2002/0056675 A1 5/2002 Hegde ........................ 210/188
2004/0151966 A1 * 8/2004 Dahlgren et al. .............. 429/34

FOREIGN PATENT DOCUMENTS

DE 198 35 525 10/1999
GB 2272652 5/1994
WO 00/47310 8/2000

OTHER PUBLICATIONS

EP 06 25 3625; European Search Report dated Oct. 10, 2006.

* cited by examiner

*Primary Examiner*—Duane Smith
*Assistant Examiner*—Karla Hawkins
(74) *Attorney, Agent, or Firm*—Renner, Otto, Boisselle & Sklar, LLP

(57) ABSTRACT

A filter element (102) comprising a filter media (106) and a membrane (114). The filter media (106) filters impurities (e.g., water and/or contaminants) from a liquid (e.g., a liquid fuel initially containing impurities) as the liquid passes from the inlet side (110) to the outlet side (112) of the filter element (102). The membrane (114) is permeable to air and impermeable to the liquid and the impurities. The membrane (114) is positioned to provide a bypass from the inlet side (110) to the outlet side (112) of the filter element whereby air intermixed with the fluid will not accumulate on the inlet side (110) of the filter element (102).

18 Claims, 13 Drawing Sheets

FILTER ELEMENT

RELATED APPLICATION

This application claims priority under 35 U.S.C. §119 (e) to U.S. Provisional Patent Application No. 60/698,827 filed on Jul. 13, 2005. The entire disclosure of this provisional application is hereby incorporated by reference.

GENERAL FIELD

This disclosure relates generally to a filter element for filtering a fluid wherein the filter media is permeable to a liquid (e.g., a liquid fuel) and impermeable to impurities (e.g., water and/or contaminants).

BACKGROUND

A filter can be used to filter a fluid comprising a liquid and impurities. For example, in a fuel system, a filter is often used to remove water from a liquid fuel to avoid negative effects to moisture-sensitive components (e.g., fuel injection equipment). Additionally or alternatively, the filter removes contaminants which can be damaging to the same or other components (e.g., engine parts). Typically, the filter comprises a filter element having an inlet side to which the fluid flows, and an outlet side from which the liquid flows with the impurities filtered therefrom. For example, in a filter element having a pleated cylindrical filter media, the radially-outer peaks of the pleats can form the inlet side of the filter element and the radially-inner peaks of the pleats can form the outlet side of the filter element.

In many filtering situations, air will often be intermixed with a fluid as it flows towards a filter element. Air will usually pass easily through a "dry" or "just wet" filter media. However, once a filter media becomes saturated with liquid, the surface tension of the liquid in the filter pores prevents air passage until the pressure drop across the filter media reaches a certain "bubble point" pressure. As a result, air tends to accumulate at the inlet side of the filter media, with the liquid passing only through lower portions of the filter media until the bubble point pressure is reached.

Air accumulation on the inlet side of a filter element can be undesirable for many reasons. For example, when fluid passes only through lower portions of a filter media (because air has accumulated at its upper inlet portions), the system can never be completely full and/or the lower portions are subjected to more wear than the upper portions. Additionally or alternatively, when fluid passes only through certain portions of a filter media, the face velocity of the liquid increases in the fluid-passing portions thereby often causing a decrease in filtration efficiency and/or water-separation (and/or contamination removal) effectiveness. Moreover, an abundance of accumulated air on an inlet side of a filter element can cause restart problems in the system to which the filtered liquid (e.g., fuel) is being provided.

SUMMARY

A filter element is provided wherein a membrane allows air (but not the to-be-filtered fluid) to bypass the filter media and flow to the outlet side of the filter element. In this manner, the air will not accumulate on the inlet side of the filter element and instead is passed to the outlet side in a gradual and/or steady manner. Thus, the filter element prevents air accumulation (and the associated problems) without, for example, a complicated venting device having relatively movable parts which open/close a bypass passage for the air.

More particularly, the filter element comprises an inlet side to which the fluid flows and an outlet side from which the liquid flows with impurities filtered therefrom. A filter media, permeable to the liquid and impermeable to the impurities, filters the liquid as it passes from the inlet side to the outlet side. A membrane (e.g., an oleophobic membrane), permeable to air and impermeable to the liquid and the impurities, allows air intermixed with the fluid on the inlet side to bypass the filter media and pass therethrough to the outlet side. In this manner, air accumulation on the inlet side of the filter element is prevented.

The filter media and the membrane, or the filter media alone, can form plurality of pleats arranged in a cylindrical shape. The radially-outer peaks of the pleats can form one of the inlet side or the outlet side of the filter element, and the radially-inner peaks of the pleats can form the other of the outlet side or the inlet side of the filter element. End caps may be positioned over the axial ends of the cylindrical shape to separate the inlet side from the outlet side.

If the filter media and the membrane together form the plurality of pleats, the membrane can form at least one of the plurality of the pleats, the filter media and the membrane can both form at least some of the pleats, and/or the filter media and the membrane can form substantially all of the pleats. The filter media can be made of a first material (permeable to the liquid and impermeable to the impurities) and the membrane can be made of a second material (permeable to air and impermeable to the liquid and the impurities). Alternatively, the membrane can initially be the same material as the filter material and treated to become impermeable to the liquid and the impurities.

The membrane can be positioned to allow air on the inlet side of the filter element to pass through an opening in the end cap to the outlet side of the filter element. For example, the membrane can form one of the walls of a member (e.g., a stack or a ring) defining a space communicating with the opening in the end cap. The member can be permanently attached to the end cap (whereby it is replaced along with the rest of the filter element) or can be selectively detachable from the end cap (whereby it can be replaced without replacement of the rest of the filter element).

These and other features are fully described and particularly pointed out in the claims. The following description and annexed drawings set forth in detail certain illustrative embodiments, these embodiments being indicative of but a few of the various ways in which the principles may be employed.

DRAWINGS

DETAILED DESCRIPTION

Figure 1A:
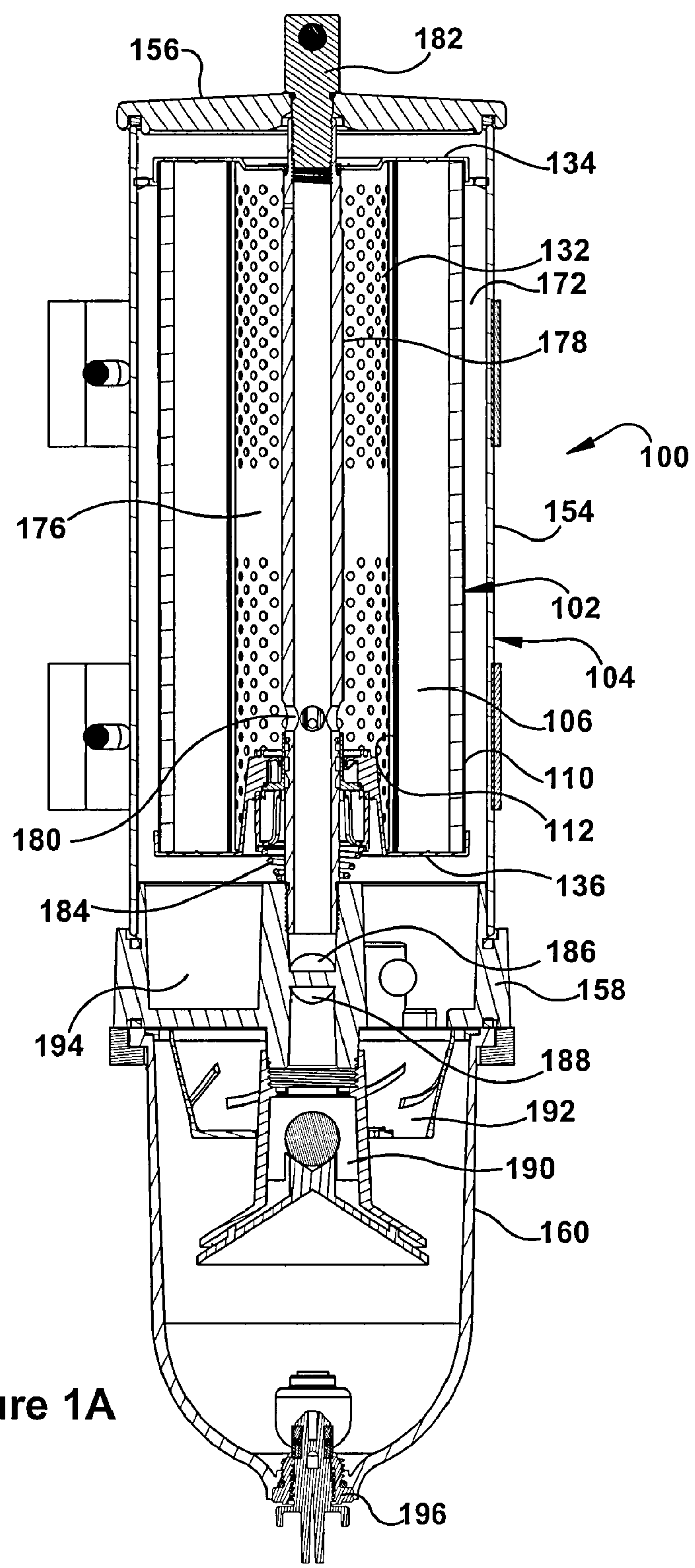
FIG. 1A is a sectional view of a filter 100 that includes a filter element 102.

Referring now to the drawings, and initially to FIG. 1A, a filter 100 is shown. The filter 100 is designed to filter a fluid comprising a liquid, which is intended for a particular purpose, and impurities, which are to be filtered from the fluid. For example, the filter 100 could be used to filter liquid fuel for a combustible engine of a motor vehicle to avoid negative effects to water-sensitive and/or contaminant-sensitive components in the fuel system.

The illustrated filter 100 comprises a filter element 102 and a housing 104 in which the filter element 102 is removably mounted. In most filtering situations, the housing 104 will be the permanent part of the filter 100. The filter element 102 is usually removable and repeatedly replaced throughout the life the filter 100.

The filter element 102 includes a filter media 106 made of a material that is, or materials that are, permeable to the liquid and impermeable to the impurities. As is best seen by referring additionally to FIGS. 1B and 1C, the filter media 106 can comprise a plurality of pleats 108 arranged in a cylindrical shape. In the illustrated embodiment, the filter 100 is such that the fluid flows radially inward, whereby the radially outer peaks of the pleats 108 define an inlet side 110 of the filter element 102 and the radially inner peaks of the pleats 108 define an outlet side 112 of the filter element 102. That being said, a filter 100 and/or filter media 106 designed for radially inward fluid flow (with the outer peaks defining the outlet side 112 and the inner peaks defining the inlet side 110) is certainly possible and contemplated. Moreover, the filter media 106 need not be cylindrical in shape and/or have a pleated construction.

The filter element 102 includes a membrane 114 which is permeable to air and impermeable to the liquid and the impurities (i.e., air can pass therethrough but the fluid cannot). In the context of the present disclosure, the term "membrane" refers to a thin sheet of material as opposed to, for example, a mechanical venting device which has movable components allowing the device to open/close to allow the passage of air therethrough. The membrane 114 is positioned in the filter 100 to allow air intermixed with the fluid on the inlet side 110 to bypass the filter media 106 and pass therethrough to the outlet side 112. In this manner, air accumulation on the inlet side 110 of the filter element 102 is prevented.

In the illustrated filter element 102, the membrane 114 forms at least one pleat 116 which, in combination with the filter pleats 108, produces the cylindrical shape of the filter media 106. The membrane pleat 116 can be initially separate from the filter pleats 108 and subsequently attached thereto. This attachment can be done prior to formation of the pleats 108/116 or after formation of the pleats 108/106 and it can be accomplished by, for example, adhesive, welding, or clipping.

The illustrated filter element 102 additionally comprises a perforated tube 132, an upper end cap 134, and a lower end cap 136. The perforated tube 132 is positioned within the filter media 106 and adjacent to the radially inner peaks of the pleats 108 and the pleat(s) 116. The tube 132 provides support for the filter media 106 and can be formed from, for example, a thin strip of steel. The perforations are sized and spaced to provide the appropriate support without undue restriction and can be, for example, about 0.125 inch in diameter and center-to-center spaced about 0.25 inch apart.

The end caps 134 and 136 are positioned, respectively, at the upper axial end and the lower axial end of the filter media 106. The caps 134/136 can be made of material imperforate to the liquid and the impurities (and air), such as, for example, plastic. The end caps 134 and 136 are attached in a fluid-tight manner (e.g., with a potting or other adhesive compound) to the filter media 106 and usually also the tube 132.

The upper end cap 134 includes a main circular wall 138 and a flanged circumferential edge 140. The main wall 138 includes a central circular indentation 142 and an opening 144 in the center thereof. The circumferential edge 140 extends downward and then outward from the circular wall 138, and it surrounds the axially upper and radially outer edge of the filter media 106.

The lower end cap 136 includes a main circular wall 146, a circumferential edge 148, and a central plug 150. The circumferential edge 148 extends upward from the circular wall 146 and surrounds the axially lower and radially outer edge of the filter media 106. The plug 150 projects upward from the circular wall 146 and its top wall has an opening 152 in the center thereof. The inner and upper surfaces of the plug 150 are profiled to accommodate and/or coordinate with certain components in the assembled filter 100 (namely, a pedestal 158 and a spring 184, introduced below).

Referring now particularly to FIG. 1A, the housing 104 includes a cylindrical side wall 154, a lid 156, a pedestal 158, and a reservoir 160. The side wall 154, the lid 156, and the pedestal 158 define a cylindrical receptacle 172 in which the filter element 102 is positioned. The space in the receptacle 172 around the filter element 102 forms a chamber 174 and the space in the receptacle within the filter element 102 forms a chamber 176. If the fluid flows radially inward, as in the illustrated filter 100, the chamber 174 will be the inlet chamber and the chamber 176 will be the outlet chamber.

In the illustrated filter 100, an standpipe 178 is positioned within the radially inner chamber 176 and includes openings 180 communicating with the chamber 176. The top portion of the pipe 178 extends through the opening 144 in the upper end cap 134 and is removably connected at its upper end to the housing wall 156 by, for example, a knob 182. The lower portion of the pipe 178 extends through the opening 152 in the lower end cap 136 and is non-removably attached to the pedestal 158. A spring 184 (or other suspending means), positioned between the end cap 136 and the pedestal 158, can be used to position the filter element 102 upwardly from the bottom of the receptacle 172 (or the top of the pedestal 158). One or more seals (not specifically shown and/or numbered) can be positioned around the standpipe 178 and/or between it and the plug 150 of the lower end cap 136. The lower end of the standpipe 178 communicates with an opening in the pedestal 158 which is the outlet 186 for the filter 100.

To replace the filter element 102, the knob 182 is detached (e.g., unscrewed), the lid 156 is removed, and the filter element 102 is lifted out of the receptacle 172. A new filter element 102 is then placed in the receptacle 172 in such a manner that standpipe 178 is inserted through the openings 144 and 152 in the end caps 134 and 136. The lid 156 is then replaced and the knob 182 re-attached and the filter 100 is ready for use.

As was indicated above, the pedestal 158 provides the outlet 186 for the filter 100, and the pedestal 158 also includes an opening which forms the filter's inlet 188. The inlet 188 is fluidly separated from the outlet 186 and is connected to baffling chamber 190 and separating chamber 192 within the reservoir 160. The chambers 190 and 192 are connected to compartments 194 within the pedestal 158 which are connected to the inlet chamber 174.

In operation, the fluid (e.g., liquid fuel and impurities such as water and/or contaminants) is introduced through the inlet 188 and travels through the baffling chamber 190 and the separating chamber 192. The chambers 190 and 192 provides a preliminary separation of water from the fluid upstream of the filter element 102 and any separated water drops to the floor reservoir 160 (which has a drain 196 for periodic emptying). The fluid then travels through the compartments 194 in the pedestal 158 and into the inlet chamber 174 whereat it encounters the inlet side 110 of the filter element 102.

Once in the inlet chamber 174, the fluid passes through the filter media 106 and the impurities are filtered therefrom. As the liquid fuel (with the water and/or contaminants removed) exits the outlet side 112 of the filter element 102, it flows through the perforated tube 132 and into the outlet chamber 176. The filtered liquid in the outlet chamber 176 passes through the openings 180 into the standpipe 178 and travels to the outlet 186 of the filter 100 for conveyance through the fuel system.

As the fluid is being filtered by the filter media 106, air within the inlet chamber 174 (or on the inlet side 110 of the filter element 102) passes through the membrane 114/116 to the outlet chamber 176 (or the outlet side 112 of the filter element 102). The filter-bypassed air travels with the filtered liquid from the outlet chamber 176 through the standpipe 178 to the outlet 186. The air can be conveyed with the liquid to the intended equipment if such conveyance is acceptable. In most fuel systems, for example, a steady flow of some air with the fuel does not create any significant fuel-injection or other issues. That being said, the filter 100 and/or filter element 102 would also be useful in a fuel or other system wherein air is eventually removed from the filtered liquid.

Figure 1B:
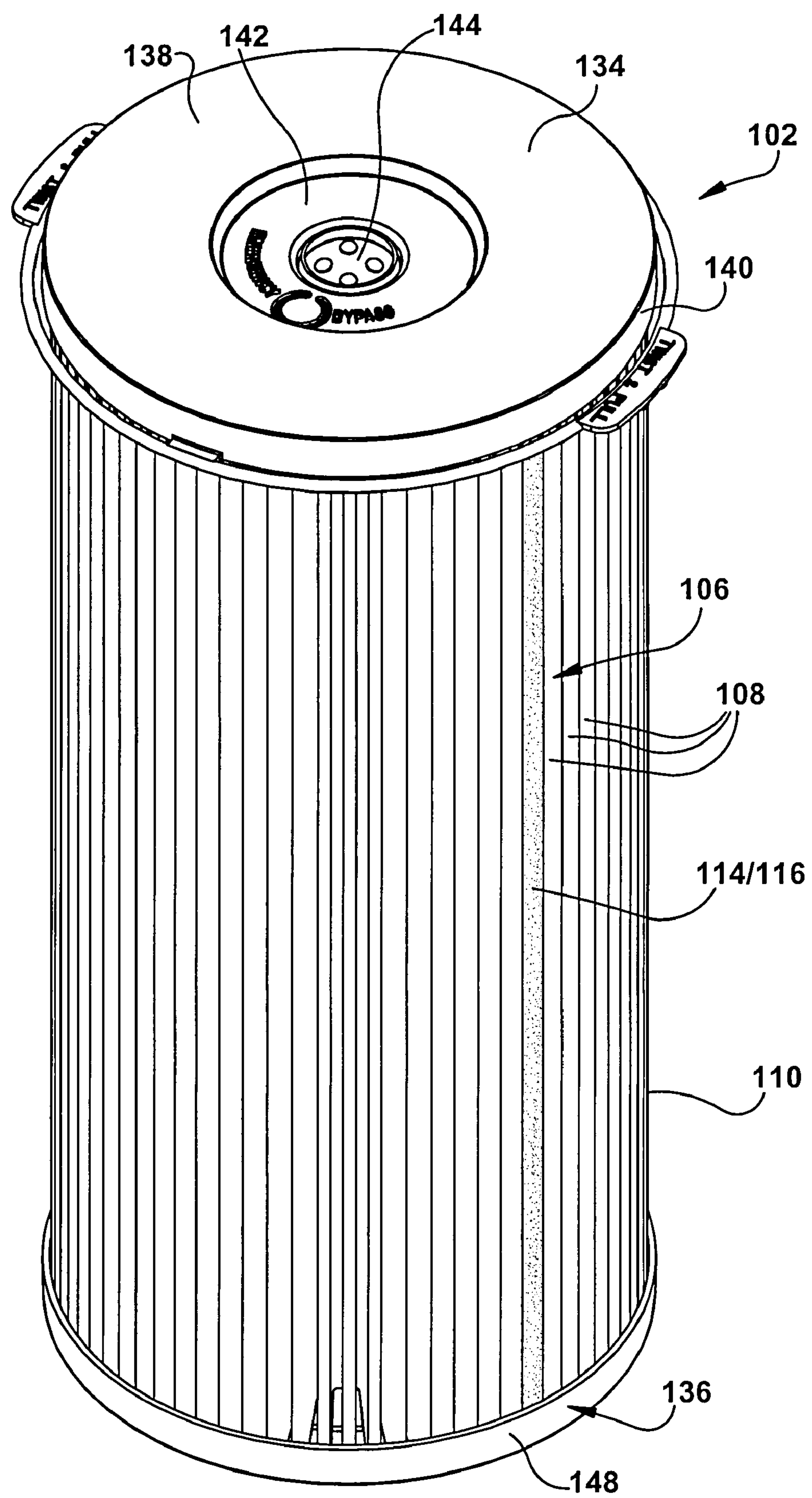
FIG. 1B is a perspective view of the filter element 102.
Figure 1C:
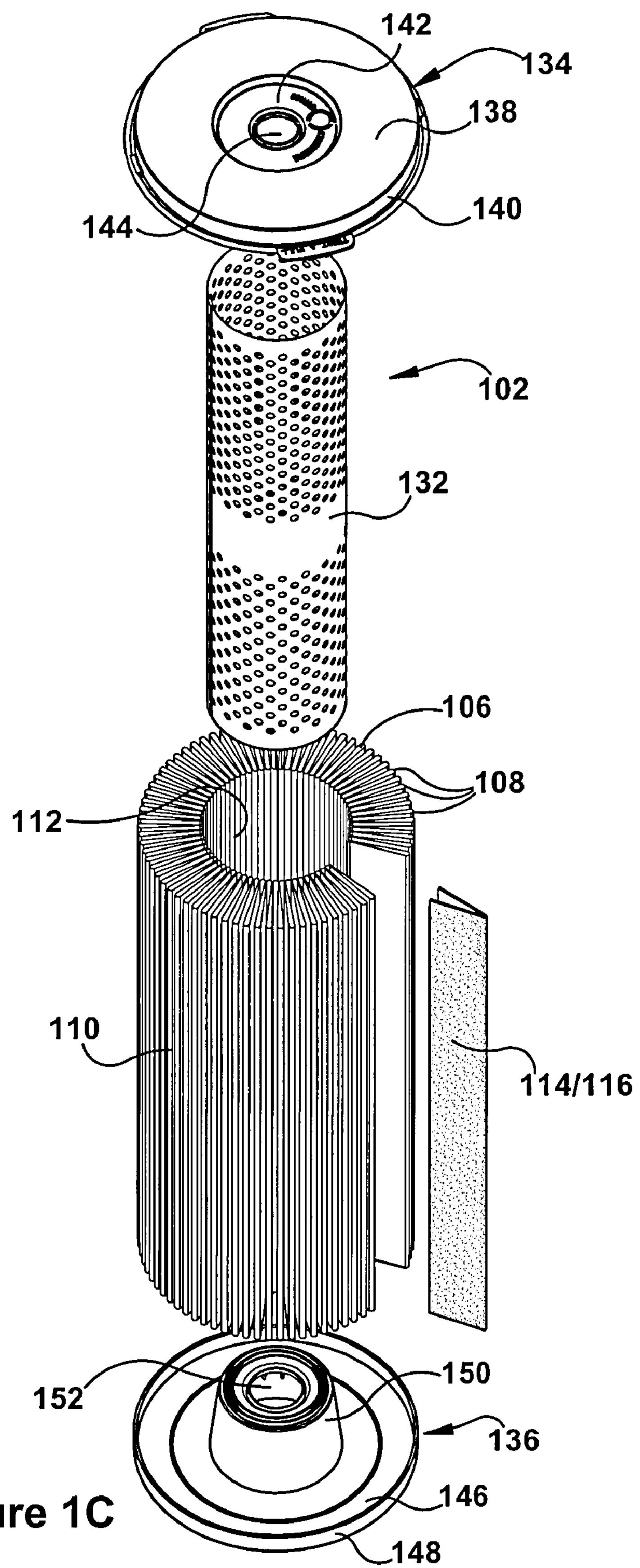
FIG. 1C is an exploded view of the filter element 102.

When the membrane 114 forms a separate pleat 116, as shown in FIGS. 1A-1C, the filter media 106 (and the pleats 108) can be made of a first material (i.e., a material which is permeable to the liquid and impermeable to the impurities) and the membrane 114 (and the pleat(s) 116) can be made of a second material (i.e., a material which is permeable to air and impermeable to the liquid and the impurities).

Figure 1D:
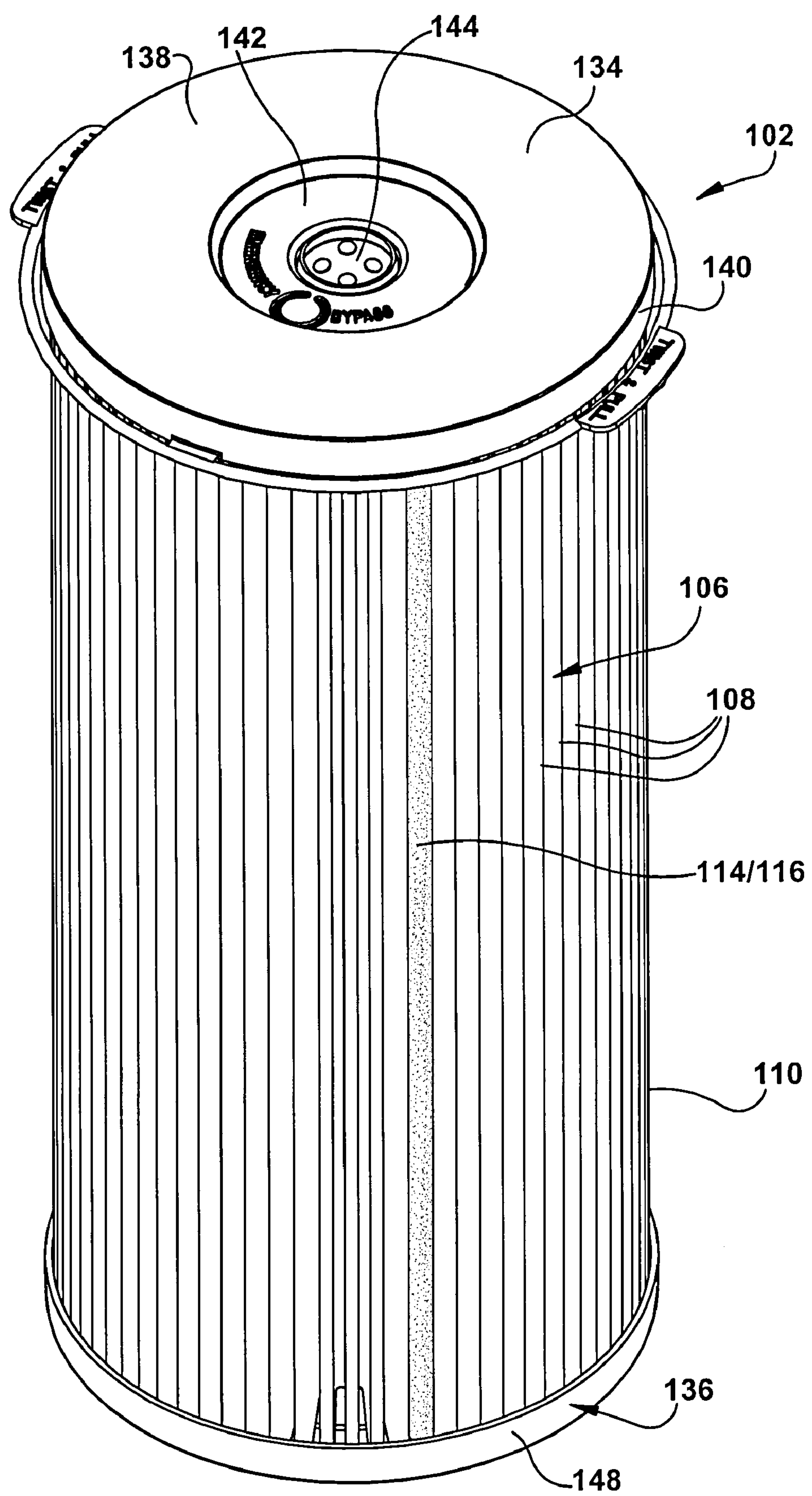
FIG. 1D is a perspective view of another form of the filter element 102.
Figure 1E:
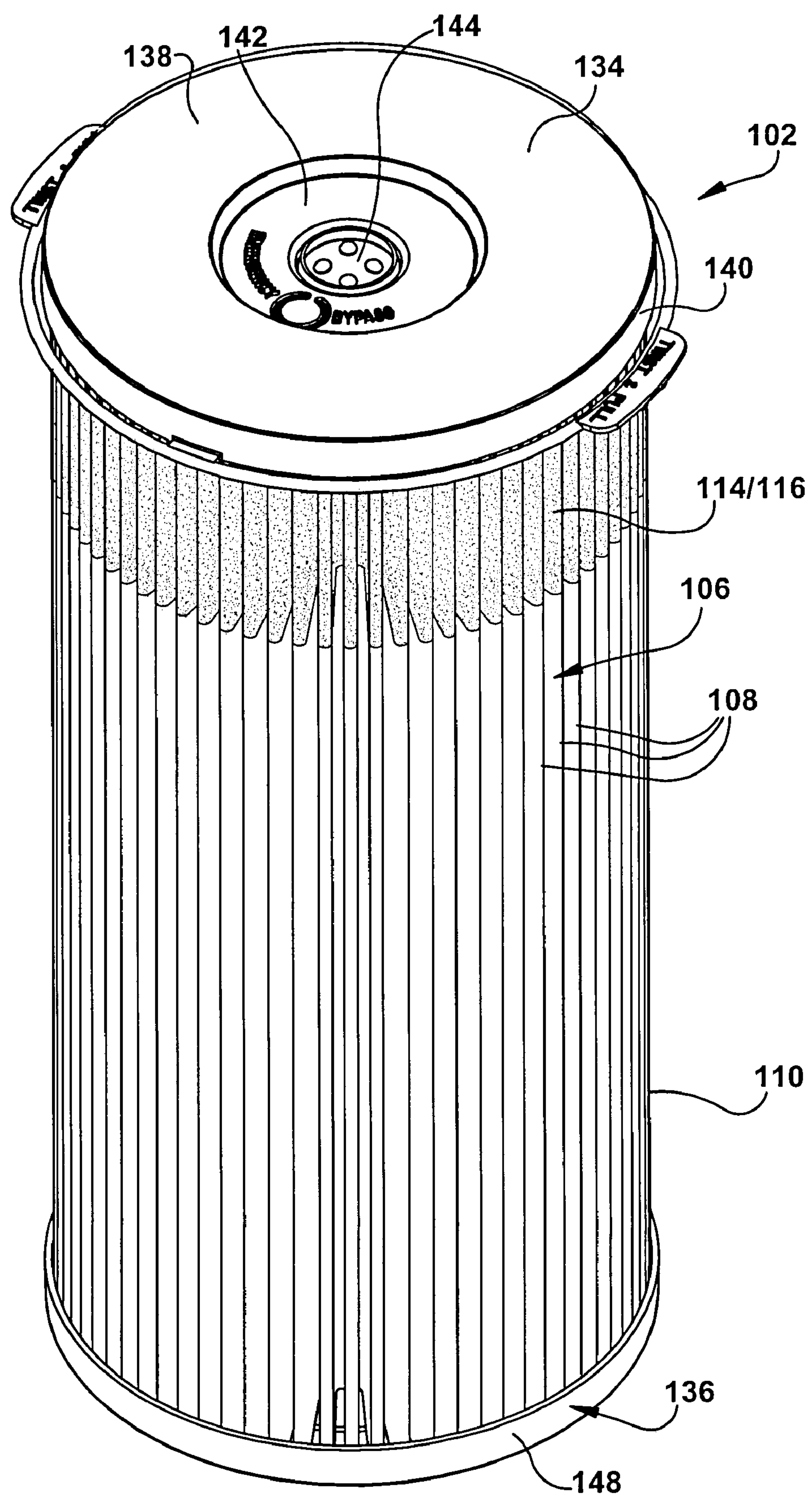
FIG. 1E is a perspective view of another form of the filter element 102.

Alternatively, as shown in FIGS. 1D and 1E, the membrane 114 can be made of the same material as the filter media 106 (i.e., a material which is permeable to the liquid and impermeable to the impurities) and subsequently treated to be permeable to air and impermeable to the liquid and the impurities. As specifically shown in FIG. 1D, one or more pleats 108 of the filter media 106 can be treated along their entire lengths (FIG. 1D) to provide an arrangement similar to that shown in FIGS. 1B-1C, but without having to separately attach the pleat(s) 116. Alternatively, as specifically shown in FIG. 1E, the top portions of one or more of the pleats 108 can be treated whereby at least some of the pleats form both the filter media 106 and the membrane 114 and/or substantially all of the pleats form both the filter media 106 and the membrane 114. In most filtering situations, the membrane 114 will be positioned vertically above at least some portions of the filter media 106.

Referring now to FIGS. 2A-2C and FIGS. 3A-3C, filters 200 and 300 are shown, respectively. The filters 200 and 300 are similar in most ways to the filter 100, and their filter elements 202 and 302 are similar in most ways to the filter element 102, whereby like reference numerals (with "100" or "200" added thereto) are used to designate like parts. In the filter element 202 and the filter element 302, the membrane 214/314 is positioned to allow air to pass through an opening in the upper end cap 234/334. In these filters 200/300, the filter pleats 208/308 can alone form the cylindrical shape of the filter media without any contribution by membrane pleats. That being said, a combination of a media-accompanying membrane 114 and a cap-mounted membrane 214/314 is certainly possible and contemplated.

Figure 2A:
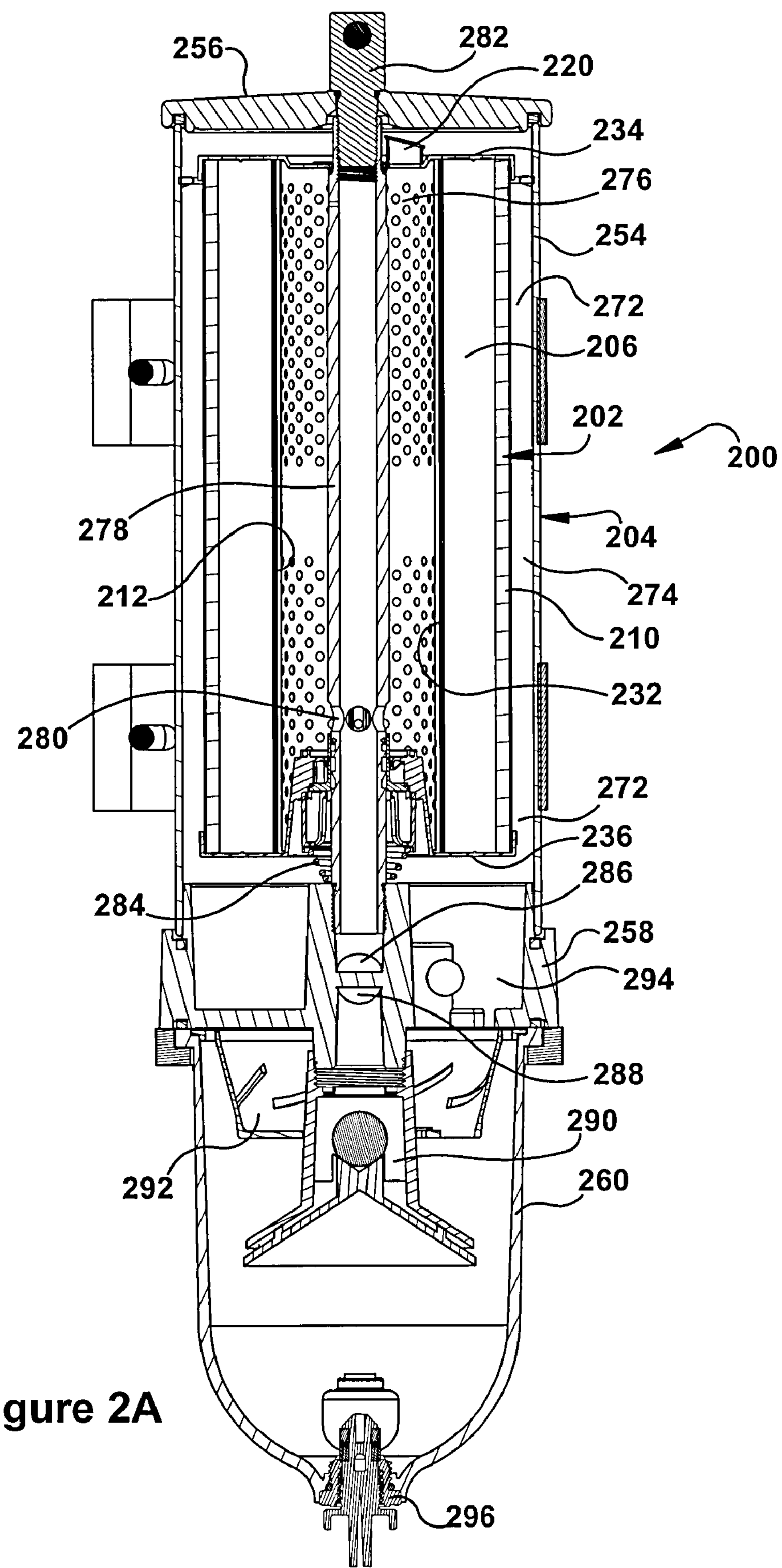
FIG. 2A is a sectional view of a filter 200 that includes a filter element 202.
Figure 2B:
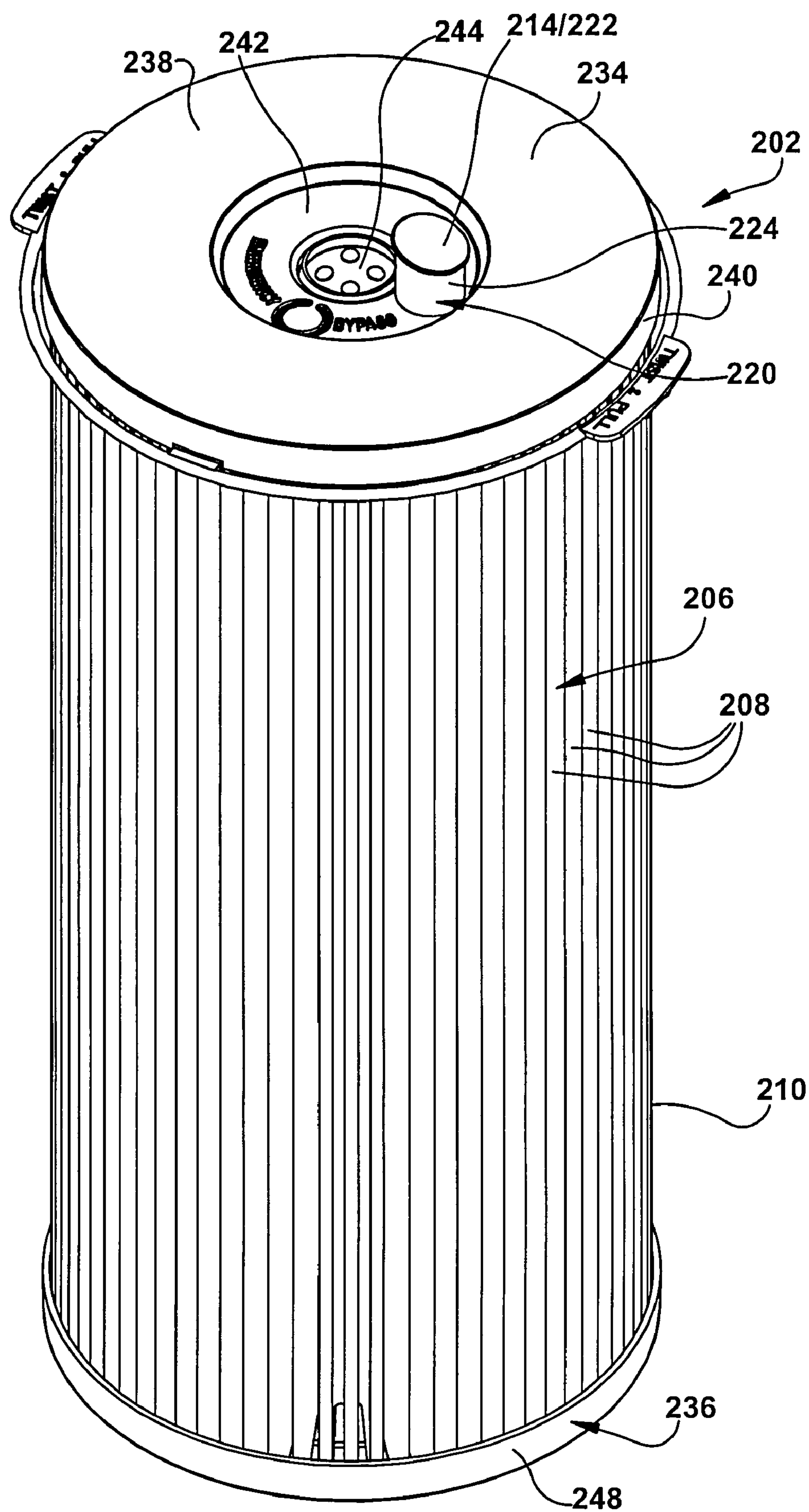
FIG. 2B is a perspective view of the filter element 202.
Figure 2C:
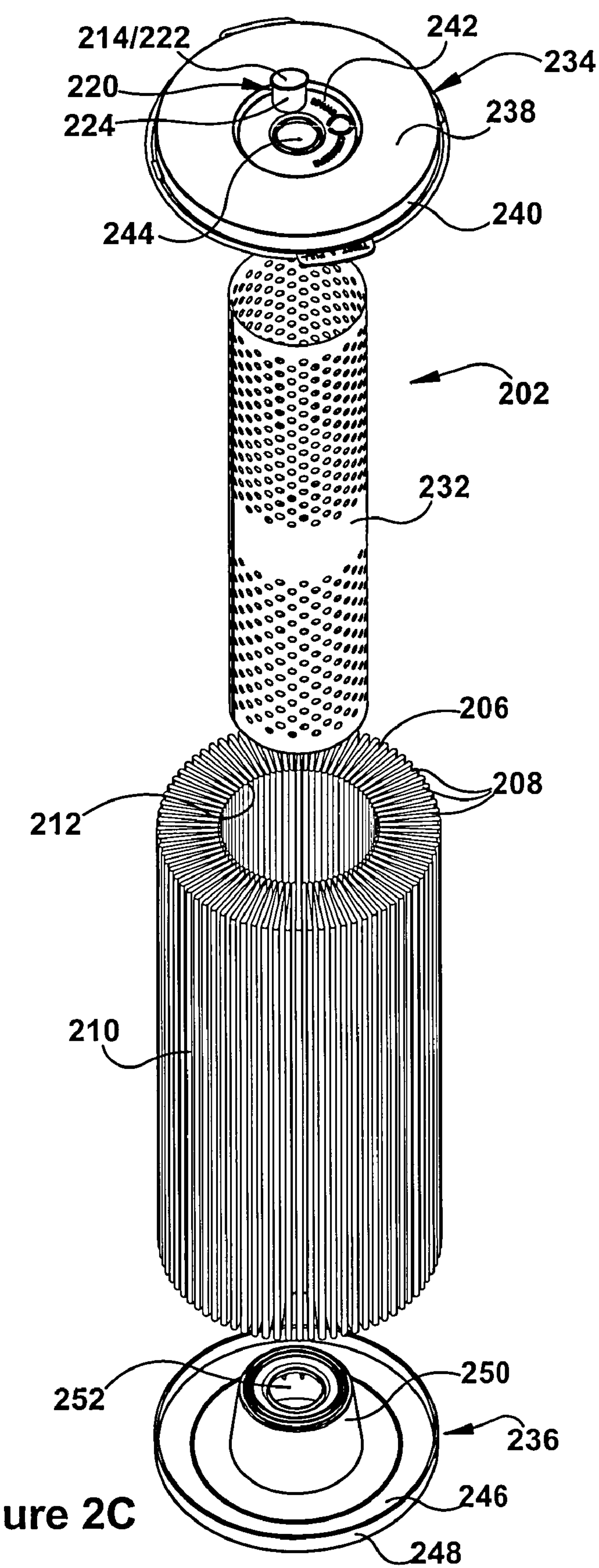
FIG. 2C is an exploded view of the filter element 202.

Referring specifically to FIGS. 2A-2C, the filter element 202 additionally comprises a member 220 attached to its upper end cap 234. The illustrated member 220 specifically comprises a stack having a slanted top wall 222 formed by the membrane 214 and a side wall 224. The walls 222 and 224 form a space communicating with an opening in the end cap 234. Air in the inlet chamber 274 can pass through the membrane wall 214/222 into the stack 220 and through the end cap 234 into the outlet chamber 276. The slanting/sloping of the top wall 222 causes any moisture forming thereon to slide off the stack 220.

Figure 3A:
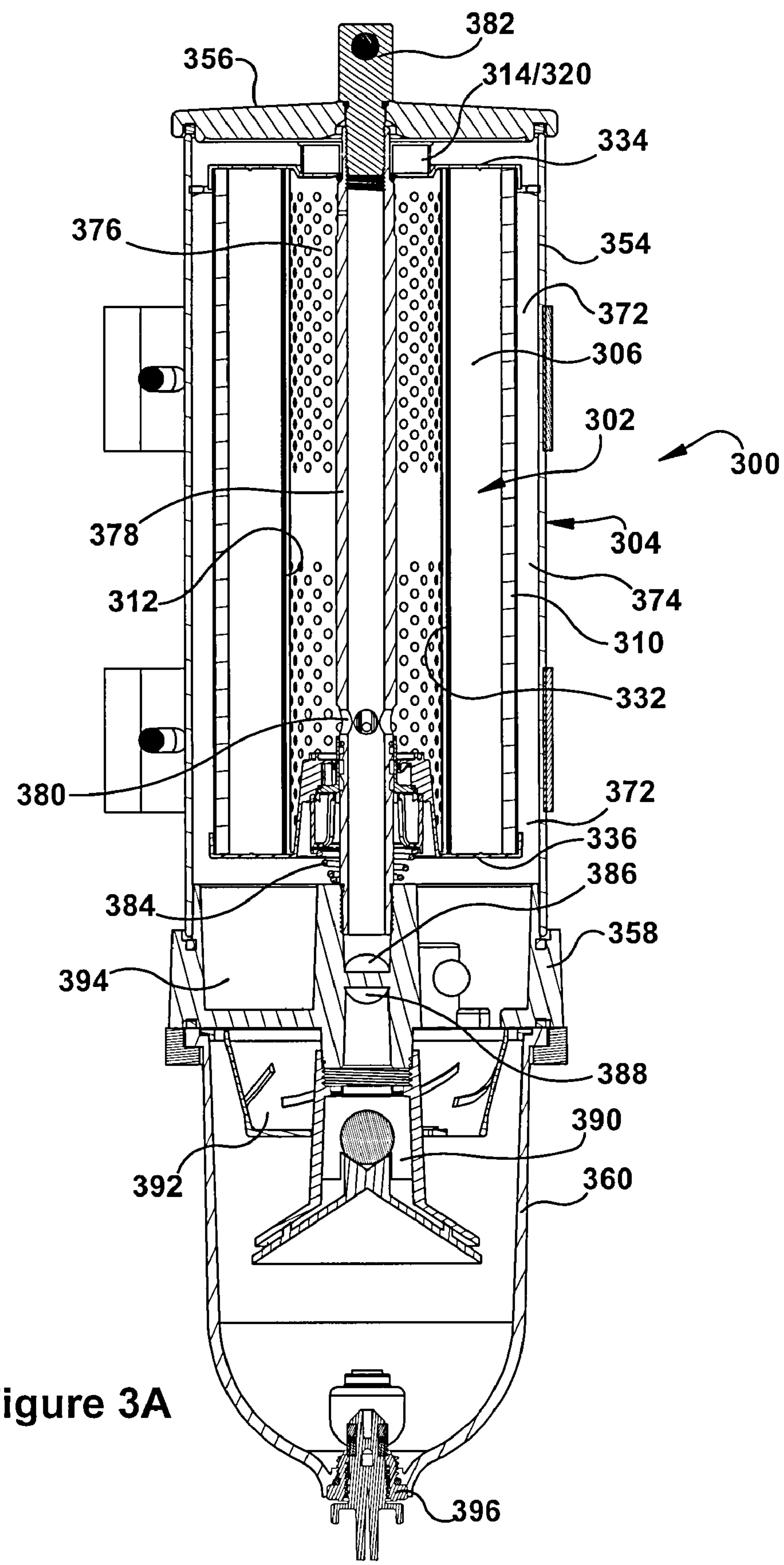
FIG. 3A is a sectional view of a filter 300 that includes a filter element 302.
Figure 3B:
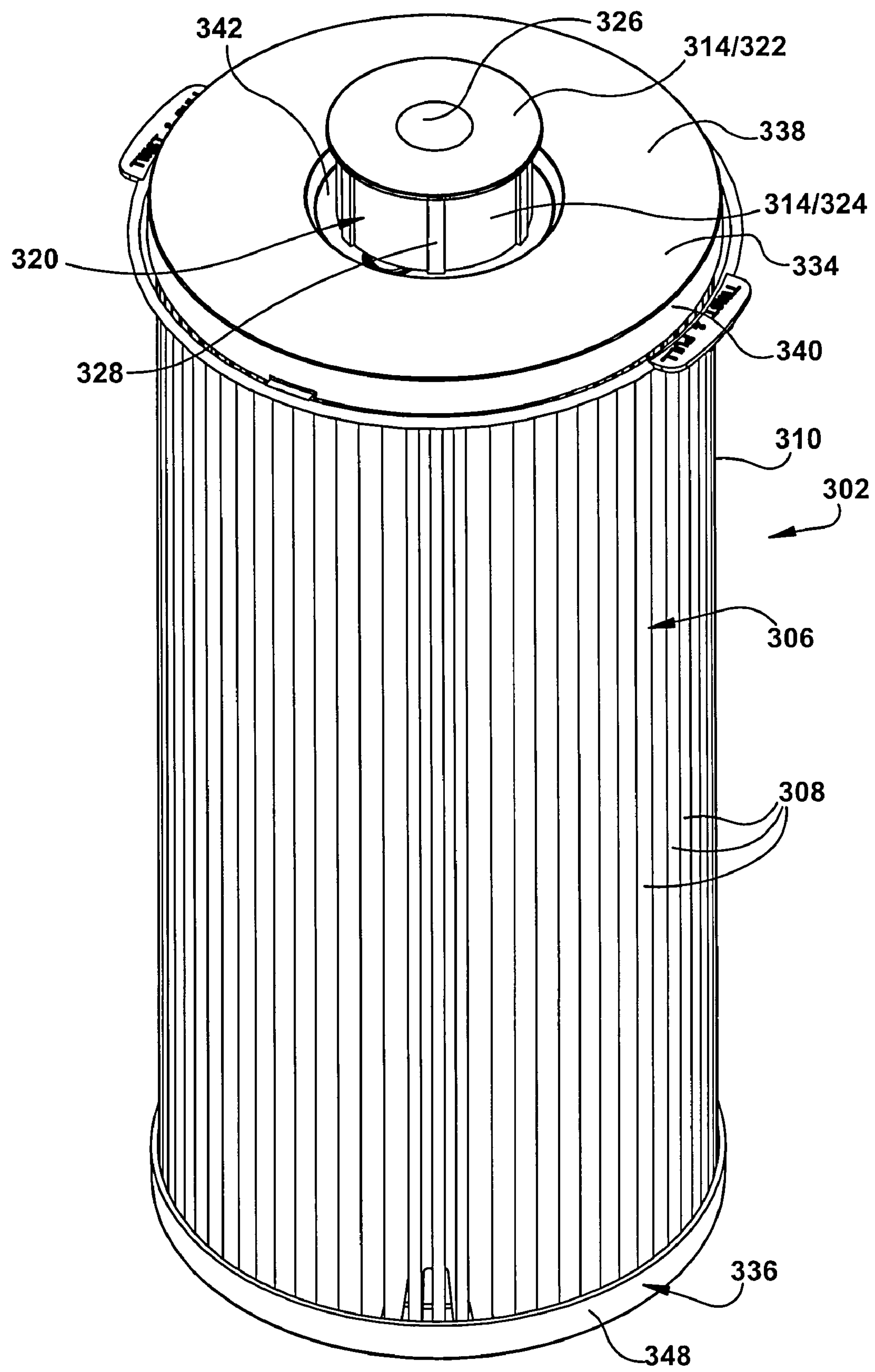
FIG. 3B is a perspective view of the filter element 302.
Figure 3C:
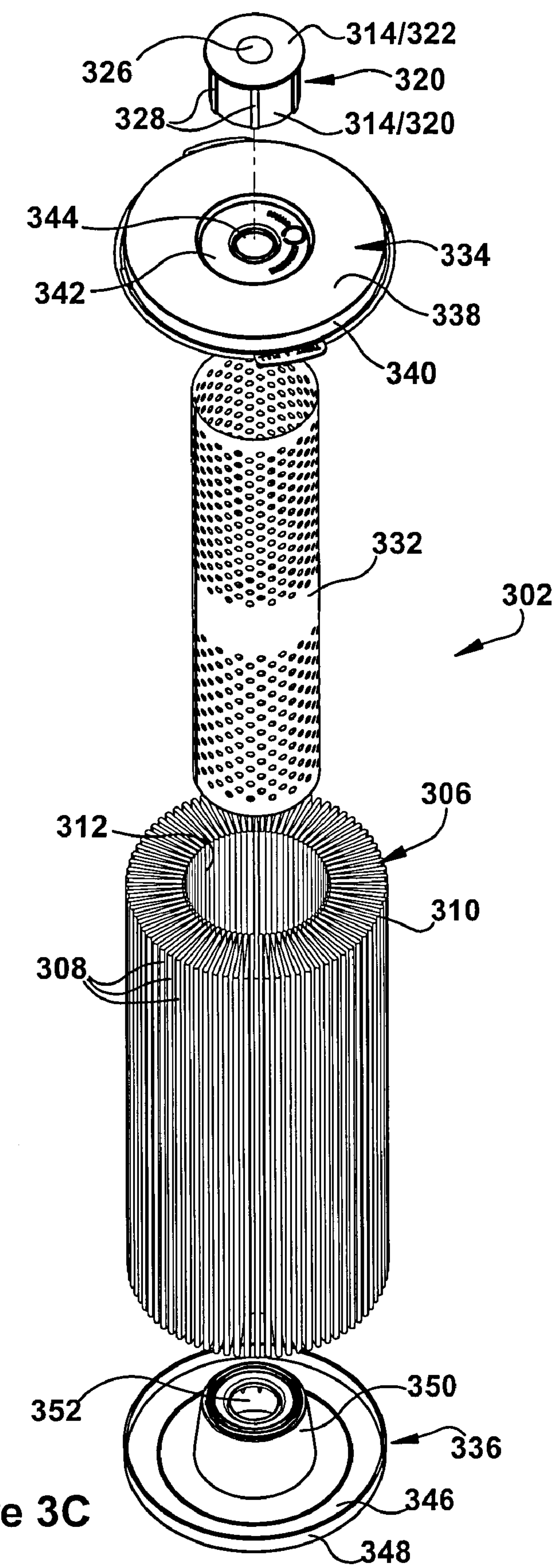
FIG. 3C is an exploded view of the filter element 302.

Referring specifically to FIGS. 3A and 3B, the filter element 302, like the filter member 202, additionally comprises a member 320 attached to the upper end cap 334. Instead of a stack-like structure, however, the member 320 comprises a ring 320 which is positioned around the knob 382 and between the upper end cap 334 and the lid 356 of the housing 304. The ring 320 has an open bottom, a top annular wall 322, an outer cylindrical wall 324, and an inner cylindrical wall which forms a central passage 326 through which the knob 382 extends. The space defined by the ring's walls communicates with the outlet chamber 376 through the opening in the upper end cap 334. The membrane 314 can form the top wall 322 and/or can form connecting sections between ribs 328 on the outer cylindrical wall 324. In this manner, air can pass from the inlet chamber 374 through the membrane 314 to the outlet chamber 376.

The ring 320 can be permanently attached (e.g., adhesively attached) to the upper end cap 334 and provided integrally with the rest of the filter element 302. Thus, when the filter element 302 is replaced, the ring 320 (and the membrane 314) would also be replaced. This arrangement may be most convenient, especially when the life of the membrane 314 will be approximately the same as the life of the filter media 306.

Alternatively, the ring 320 can be provided separate from the other components of the filter element 302 and assembled therewith upon insertion of the filter element 302 into the housing 304. In this manner, the ring 320 can be replaced separately (and thus more frequently) than the rest of the filter element 302 should the membrane 314 have a shorter useful life than the filter media 306. For example, the filter element 302 could be positioned within the reservoir 360, the ring 320 placed on top of the upper end cap 334, and the lid 356 placed thereover. The tightening of the knob 382 to seal the lid 356 would also push the bottom edge of the ring 320 against the upper end cap 334 when closing the lid 356 of the housing 304. Adhesive and/or sealing means on the bottom edge of the ring 320 could be provided to prevent any bypass of the fluid past the membrane 314.

The membrane 114/214/314 can be a hydrophobic membrane. In a fuel filtering application, the membrane 114/214/314 can be an oleophobic membrane that is not wettable by oil-based products such as petrol and diesel fuel. (The term "oleophobic" pertains to medium which yields a minimum contact angle of between 100° and 140° with mineral oil when measured by the Sessile Drop Method.) Suitable hydrophobic/oleophobic materials can comprise, for example, a polymer substrate having an oligomer bonded thereto. The substrate can be a woven material, a non-woven material or melt-blown material. The polymer can be a polyethylene, a poly(tetrafluoro-ethylene), a poly (tetrafluoroethylene-coethylene), a polyamide, a polyacrylate, a polymethacrylate, a polyester, a polypropylene, a nylon, and/or a polyurethane. The oligomer may be a fluorine-containing monomer (e.g., hexafluoropropylene) or a fluoropolymer (e.g., polytetrafluoroethylene or fluorinated ethylenepropylene).

When filter material is treated to form the membrane (see e.g., the membrane 114 and/or pleat(s) 116 in FIGS. 1D and 1E), an oleophobic coating can be vapor deposited onto, extruded onto, or otherwise bonded to the filter material. The oleophobic coating can comprise, for example, an alkylene, an acrylate, a methacrylate, a fluorine-containing monomer (e.g., hexafluoropropylene), and/or a fluoropolymer (e.g., polytetrafluoroethylene or fluorinated ethylenepropylene). In most instances, it will be most convenient to treat the filter material prior to its pleating and/or forming into a cylindrical shape. That being said, pre-pleating and/or pre-shaping treatment are certainly possible and contemplated.

Figure 4:
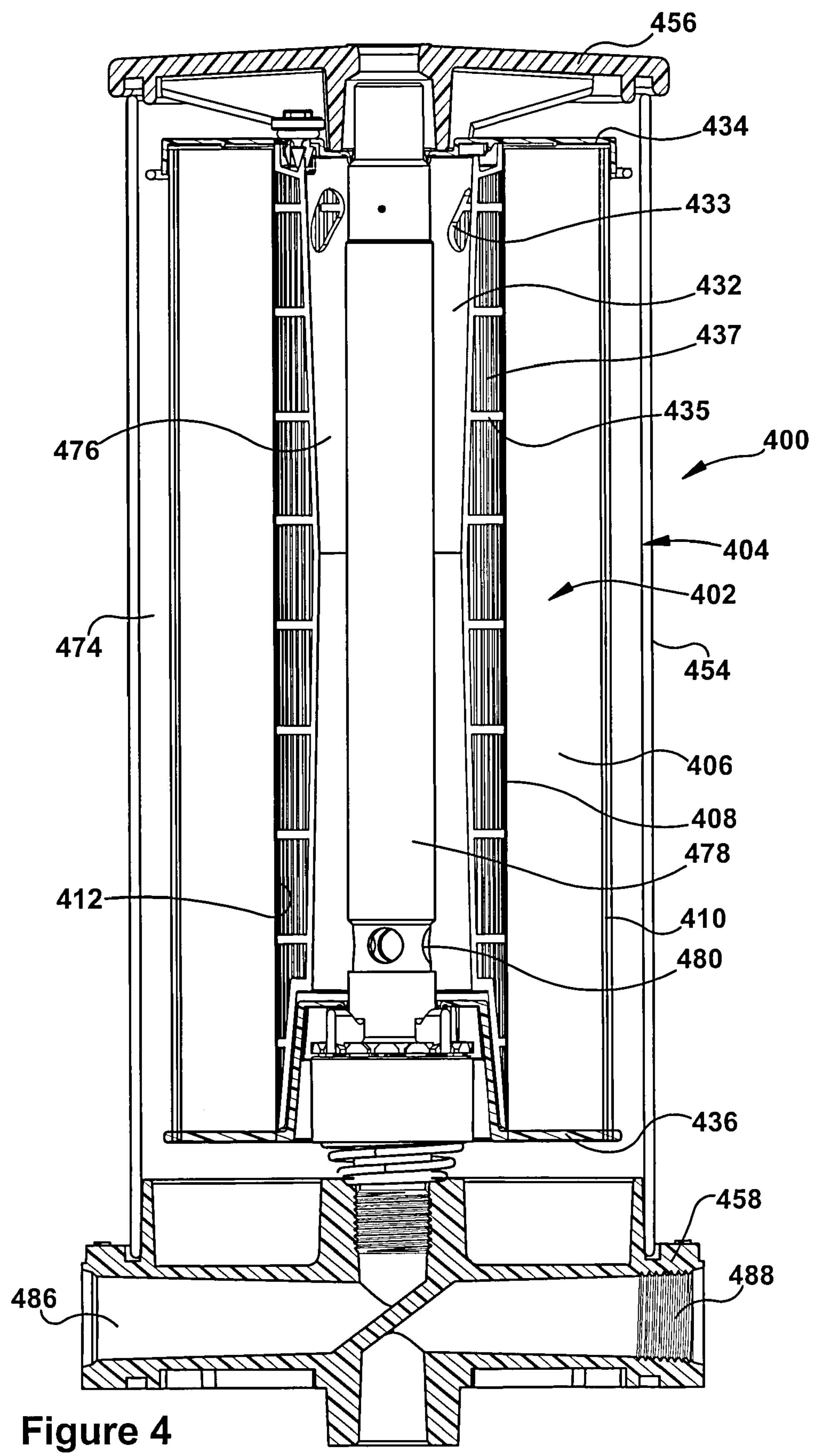
FIG. 4 is a sectional view of a filter 400.

Referring to FIG. 4, a filter 400 is shown. The filter 400 is similar in many ways to the filters 100, 200 and/or 300, whereby like reference numerals, with "300" added thereto, are used to designate like parts. (Although it is noted that only the most relevant reference numbers are indicated on the drawing.) The filter 400 has a filter element 402 that can comprise a membrane which is permeable to air and impermeable to the liquid and the impurities. The membrane can be incorporated into one or more pleats 408 of the filter media 406 (e.g., as in the membrane pleat(s) 116 in FIG. 1), or it can be positioned in allow air to pass through an opening in the upper end cap 434 (e.g., the stack 220 in FIG. 2 or the ring 320 in FIG. 3).

The filter 400 has a center tube 432, but it is not perforated like the tubes 132, 232, and/or 332. Instead, the center tube 432 is solid and impermeable to the liquid except for slots 433 near its upper end. Radial projections 435 position the center tube 432 radially inward from the outlet side 412 of the filter element 402 thereby forming an annular holding chamber 437 and a spiral flow path climbing upward around the tube 432.

In operation, the fluid (e.g., liquid fuel and impurities such as water and/or contaminants) is introduced through the inlet 488 and passes through the filter media 406 with impurities being filtered therefrom. As the liquid fuel (with the impurities removed) exits the outlet side 412 of the filter element 402, it flows into the holding chamber 437 and remains there until the filtered fluid rises to the level of the slots 433. The elevated fluid flows through the slots 433, into the outlet chamber 476, though the openings 480 into the standpipe 478, and to the outlet 486. As the fluid is being filtered by the filter media 406, air within the inlet chamber 474 passes through the membrane (not shown) into the holding chamber 437 and then through the slots 433 in the center tube 432. If the membrane is incorporated into the filter media 406, it may be best to position it in the upper regions (see, e.g., FIG. 1E) to allow the air easy access to the slots 433 and/or to prevent accumulated fuel in the shallow regions of the chamber 437 from blocking air flow. If the membrane is positioned to allow air flow through an opening in the upper end cap 434 (see, e.g., FIGS. 2 and 3), these issues are eliminated.

Figure 5:
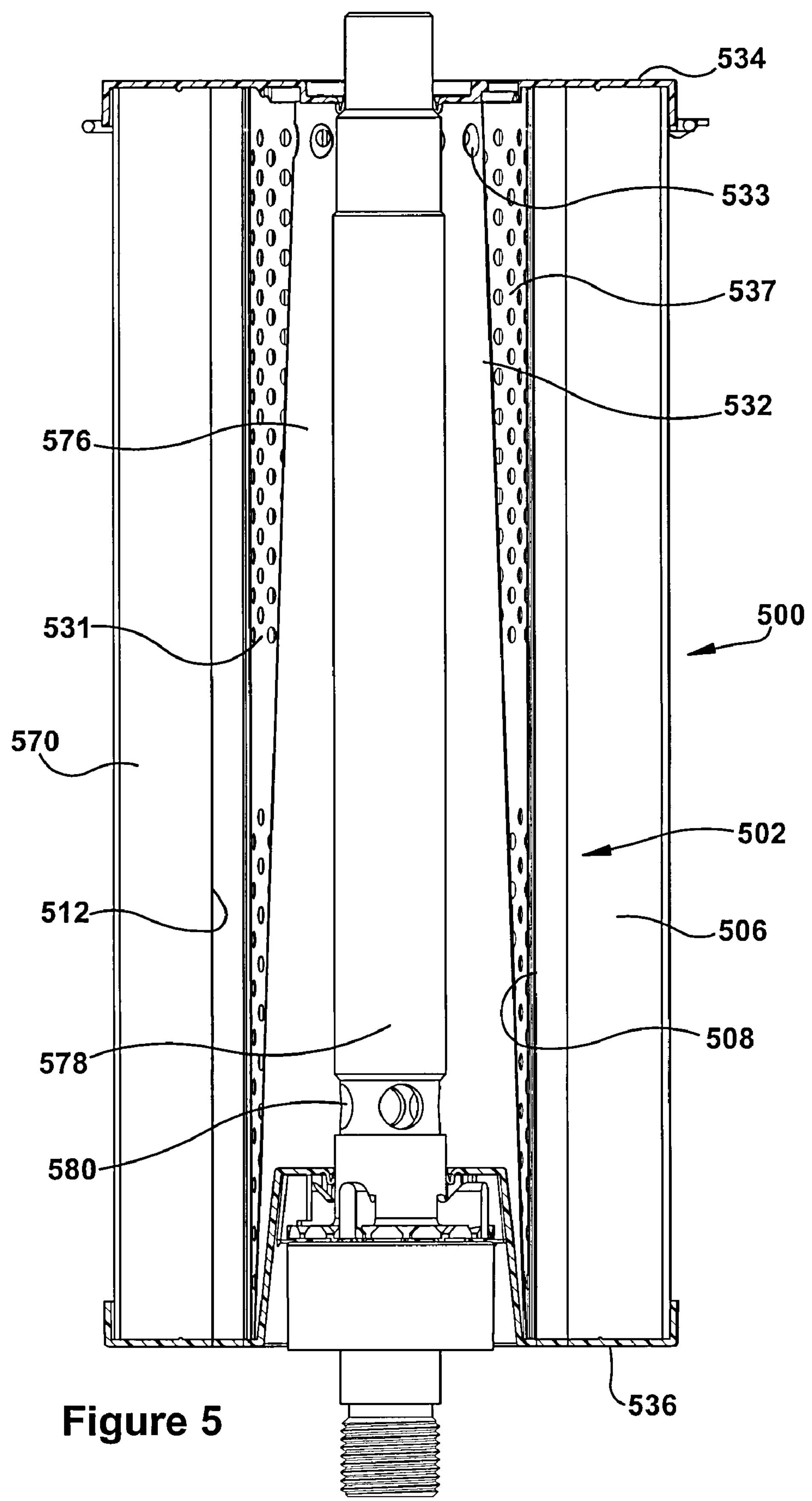
FIG. 5 is a sectional view of a filter element 502.

Referring to FIG. 5, a filter element 502 is shown which is the same as the filter element 402 (whereby like reference numbers, with "100" added thereto are used) except for the center tube construction. The filter element 502 may mounted within a housing, such as, for example, the housings 104, 204, 304 and 404 shown below. As with the filter element 402, the filter element 502 that can comprise a membrane which is permeable to air and impermeable to the liquid and the impurities, incorporated into one or more pleats, and/or end caps.

The filter element 502 has a center tube 531 which is perforated and positioned against the outlet side 512 of the filter media 506. Another center tube 532 is positioned within the center tube 531, this tube being solid and impermeable to the liquid except for perforations 533 near its upper end. The annular space between the tubes 531 and 532 form the holding chamber 537. As the liquid fuel (with the impurities removed) exits the outlet side 512 of the filter element 502, it flows through the perforations in the tube 531 into the holding chamber 537. In the holding chamber 537, the filtered fluid rises to the level of the perforations 533 and flows therethrough into the outlet chamber 576, and though the openings 580 into the standpipe 578. As the fluid is being filtered by the filter media 506, air within the inlet chamber 574 bypasses the filter media 506 through a membrane (not visible) in the same manner as in the filter 400.

One may now appreciate that the disclosed filter elements each have a membrane which allows air (but not the to-be-filtered fluid) on the inlet side to bypass the filter media and flow to the outlet side of the filter element. This bypass prevents air from accumulating on the inlet side of the filter element and the air is instead passed to the outlet side in a gradual and/or steady manner. Although the filters, filter elements, and/or membranes have been shown and described with respect to certain preferred embodiments, it is apparent that equivalent and obvious alterations and modifications will occur to others skilled in the art upon the reading and understanding of this specification. The present invention includes all such alterations and modifications and is limited only by the scope of the following claims.

In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A filter element for filtering a fluid comprising liquid and impurities, said filter element comprising:

an inlet side to which the fluid flows;

an outlet side from which the liquid flows with impurities filtered therefrom;

a filter media, permeable to the liquid and impermeable to the impurities, which filters the impurities from the fluid so that the liquid passes from the inlet side to the outlet side;

a membrane, permeable to air and impermeable to the liquid and the impurities, which allows air intermixed with the fluid on the inlet side to bypass the filter media and pass therethrough to the outlet side to thereby prevent air accumulation on the inlet side;

wherein the filter media is permeable to liquid fuel and impermeable to water and wherein the membrane is permeable to air and impermeable to the liquid fuel and water.

2. A filter element for filtering a fluid comprising liquid and impurities, said filter element comprising:

an inlet side to which the fluid flows;

an outlet side from which the liquid flows with impurities filtered therefrom;

a filter media, permeable to the liquid and impermeable to the impurities, which filters the impurities from the fluid so that the liquid passes from the inlet side to the outlet side;

a membrane, permeable to air and impermeable to the liquid and the impurities, which allows air intermixed with the fluid on the inlet side to bypass the filter media and pass therethrough to the outlet side to thereby prevent air accumulation on the inlet side;

wherein the filter media and the membrane together form a plurality of pleats.

3. A filter element as set forth in claim 2, wherein the membrane forms at least one of the plurality of pleats.

4. A filter element as set forth in claim 2, wherein the filter media is made of a material which is permeable to the liquid and impermeable to the impurities and the membrane is made of another material which is permeable to air and impermeable to the liquid and the impurities.

5. A filter element as set forth in claim 2, wherein the filter media is made of a material which is permeable to the liquid and impermeable to the impurities and wherein the membrane is made of the same material and treated to be permeable to air and impermeable to the liquid and the impurities.

6. A filter element as set forth in claim 5, wherein as least some of the pleats form both the filter media and the membrane.

7. A filter element as set forth in claim 5, wherein substantially all of the pleats form both the filter media and the membrane.

8. A filter element as set forth in claim 5, wherein the material is treated with an oleophobic coating.

9. A filter element for filtering a fluid comprising liquid and impurities, said filter element comprising:

an inlet side to which the fluid flows;

an outlet side from which the liquid flows with impurities filtered therefrom;

a filter media, permeable to the liquid and impermeable to the impurities, which filters the impurities from the fluid so that the liquid passes from the inlet side to the outlet side;

a membrane, permeable to air and impermeable to the liquid and the impurities, which allows air intermixed with the fluid on the inlet side to bypass the filter media and pass therethrough to the outlet side to thereby prevent air accumulation on the inlet side;

an end cap; and a member attached to the end cap and including the membrane;

wherein the filter media comprises a plurality of pleats arranged in a cylindrical shape with radially-outer peaks of the pleats forming the inlet or outlet side and radially-inner peaks of the pleats forming the outlet or inlet side;

wherein the end cap is positioned over an axial end of the cylindrical shape;

wherein the membrane is positioned to allow air to pass through an opening in the end cap to the outlet side;

wherein the member is selectively detachable from the end cap to allow replacement of the membrane without replacement of the rest of the filter element.

10. A filter element as set forth in claim 9, the member having walls defining a space communicating with the opening in the end cap, and the membrane at least partially forming at least one of the walls of the member.

11. A filter element as set forth in claim 10, wherein the member comprises a stack projecting from the end cap and wherein the wall formed by the membrane is a top wall of the stack.

12. A filter element as set forth in claim 10, wherein the member comprises a ring and wherein the wall(s) formed by the membrane comprise a top wall and/or a side wall of the ring.

13. A filter element as set forth in claim 1, wherein the membrane comprises an oleophobic material.

14. A filter element as set forth in claim 1, further comprising a center tube positioned against a radially inner side of the filter media and having perforations extending the length of the filter media.

15. A filter element as set forth in claim 1, further comprising a center tube positioned radially inward from a radially inner side of the filter media and having perforations only in an upper region, the center tube defining a holding chamber between it and the filter media.

16. A filter element as set forth in claim 15, wherein radial projections extend between the center tube and the radially inner side of the filter media and wherein the radial projection form a spiral flow path climbing upward around the center tube.

17. A filter element as set forth in claim 1, further comprising:

a first center tube positioned against a radially inner side of the filter media and having perforations extending the length of the filter media, and a second center tube having perforations only in an upper region and positioned within the first center tube;

wherein the first and second center tubes define a holding chamber therebetween.

18. A filter comprising a housing and a filter element as set forth in claim 1, the housing defining an inlet chamber providing fluid to the inlet side of the filter element and an outlet chamber receiving fluid from the outlet side which passed through filter media and receiving air which passed through the membrane to the outlet side.

* * * * *

UNITED STATES PATENT AND TRADEMARK OFFICE

CERTIFICATE OF CORRECTION

PATENT NO. : 7,648,565 B2
APPLICATION NO. : 11/456099
DATED : January 19, 2010
INVENTOR(S) : Clausen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this

Twenty-third Day of November, 2010

David J. Kappos

*Director of the United States Patent and Trademark Office*